(12) United States Patent
Aoki et al.

(10) Patent No.: US 10,095,453 B2
(45) Date of Patent: Oct. 9, 2018

(54) INFORMATION PROCESSING APPARATUS, INFORMATION PROCESSING METHOD, AND NON-TRANSITORY COMPUTER-READABLE RECORDING MEDIUM STORING COMPUTER-READABLE PROGRAM

(71) Applicants: Yosuke Aoki, Kanagawa (JP); Hitoshi Moriyama, Kanagawa (JP)

(72) Inventors: Yosuke Aoki, Kanagawa (JP); Hitoshi Moriyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/795,458

(22) Filed: Oct. 27, 2017

(65) Prior Publication Data

US 2018/0052644 A1 Feb. 22, 2018

Related U.S. Application Data

(63) Continuation of application No. 15/029,014, filed as application No. PCT/JP2014/081675 on Nov. 25, 2014, now Pat. No. 9,811,297.

(30) Foreign Application Priority Data

Nov. 29, 2013 (JP) ................................ 2013-248687
Mar. 17, 2014 (JP) ................................ 2014-054114
Nov. 14, 2014 (JP) ................................ 2014-231952

(51) Int. Cl.
*G06F 3/12* (2006.01)
(52) U.S. Cl.
CPC .......... *G06F 3/1247* (2013.01); *G06F 3/1205* (2013.01); *G06F 3/1206* (2013.01);
(Continued)

(58) Field of Classification Search
CPC .... G06F 3/1247; G06F 3/1285; G06F 3/1282; G06F 3/1253; G06F 3/1205;
(Continued)

(56) References Cited

U.S. PATENT DOCUMENTS 8,988,711 B2 3/2015 Iida
2004/0190057 A1* 9/2004 Takahashi ............. G06F 3/1205
358/1.15
(Continued)

FOREIGN PATENT DOCUMENTS

JP H09-179833 7/1997
JP 2011-060154 3/2011
(Continued)

OTHER PUBLICATIONS

International Search Report dated Jan. 6, 2015 in PCT/JP2014/081675 filed on Nov. 25, 2014.
(Continued)

*Primary Examiner* — Allen H Nguyen
(74) *Attorney, Agent, or Firm* — IPUSA, PLLC

(57) ABSTRACT

An information processing apparatus generates drawing data by using printing data and print setting information. The information processing apparatus includes a conversion unit that converts the print setting information into apparatus setting information; a plurality of drawing data generating units that generates the drawing data based on the printing data and the apparatus setting information; and a generating unit controller that analyzes the apparatus setting information to select one of the drawing data generating units and controls the selected drawing data generating unit in a control procedure corresponding to the selected drawing data generating unit.

10 Claims, 14 Drawing Sheets

(52) U.S. Cl.
CPC .......... G06F 3/1208 (2013.01); G06F 3/1253 (2013.01); G06F 3/1282 (2013.01); G06F 3/1285 (2013.01); G06F 3/1248 (2013.01); G06F 3/1275 (2013.01)

(58) Field of Classification Search
CPC .... G06F 3/1208; G06F 3/1206; G06F 3/1248; G06F 3/1275
USPC ........................................................ 358/1.13
See application file for complete search history.

(56) References Cited

U.S. PATENT DOCUMENTS

| | | |
|---|---|---|
| 2006/0146353 A1 | 7/2006 | Yue et al. |
| 2006/0221357 A1 | 10/2006 | Uzawa |
| 2007/0127064 A1* | 6/2007 | Kuroshima ........... G06F 3/1204 358/1.15 |
| 2010/0017705 A1* | 1/2010 | Sato ................... H04N 1/00442 715/243 |
| 2010/0315681 A1 | 12/2010 | Misawa et al. |
| 2011/0063661 A1 | 3/2011 | Nishihara |
| 2012/0019856 A1 | 1/2012 | Oshima |
| 2012/0140259 A1* | 6/2012 | Ozawa ................ G06K 15/1861 358/1.13 |
| 2012/0176632 A1* | 7/2012 | Katano .................. B41J 2/2114 358/1.9 |
| 2013/0021621 A1 | 1/2013 | Sato |
| 2013/0278953 A1* | 10/2013 | Yukie ..................... G06K 15/02 358/1.9 |
| 2014/0067456 A1 | 3/2014 | Kashida |

FOREIGN PATENT DOCUMENTS

| | | |
|---|---|---|
| JP | 2012-027737 | 2/2012 |
| JP | 2012-238188 | 12/2012 |
| JP | 2013-088992 | 5/2013 |

OTHER PUBLICATIONS

Extended European Search Report for 14866365.1 dated Nov. 8, 2016.

* cited by examiner

FIG.5A

```
<JDFxmlns="http://www.CIP4.org/JDFSchema_1_1" xmlns:C="www.ccc.com/schema/ccc" ...>
     :
  <ResourceLinkPool>
    <ComponentLink ... Amount = "2" ... />
     :
  </ResourceLinkPool>
  <ResourcePool>
    <LayoutPreparationParams ... Rotate = "Rotate90" ... >
     :
    </LayoutPreparationParams>
     :
  </ResourcePool>
     :
</JDF>
```

FIG.5B

```
<JDFxmlns="http://www.CIP4.org/JDFSchema_1_1" xmlns:A="www.aaa.com/schema/aaa" ...>
     :
  <ResourceLinkPool>
    <ComponentLink ...  Amount = "2" ... />
     :
  </ResourceLinkPool>
  <ResourcePool>
    <LayoutPreparationParams ... A:Rotate = "2" ... >
     :
    </LayoutPreparationParams>
     :
  </ResourcePool>
     :
</JDF>
```

FIG.5C

```
<JDFxmlns="http://www.CIP4.org/JDFSchema_1_1" xmlns:B="www.bbb.com/schema/bbb" ...>
     :
  <ResourceLinkPool>
    <ComponentLink ... B:DeliveryAmount ="2" ... />
     :
  </ResourceLinkPool>
  <ResourcePool>
    <LayoutPreparationParams ... B:AlternateRotation ="false" .... B:Rotate = "1" >
     :
    </LayoutPreparationParams>
     :
  </ResourcePool>
     :
</JDF>
```

FIG.6A

| JDF OF COMPANY C | | JOB ATTRIBUTES WITHIN DFE | |
|---|---|---|---|
| ATTRIBUTE NAME | VALUE | ITEM NAME | ITEM VALUE |
| Amount | | NUMBER OF COPIES | |
| | 1-32767 | | 1-32767 COPIES |
| Rotate | | ROTATION | |
| | Rotate0 | | 0° ROTATION |
| | Rotate90 | | 90° ROTATION |
| | Rotate180 | | 180° ROTATION |
| | Rotate270 | | 270° ROTATION |
| ... | | ... | |
| | ... | | ... |
| | ... | | ... |

FIG.6B

| JDF OF COMPANY A | | JOB ATTRIBUTES WITHIN DFE | |
|---|---|---|---|
| ATTRIBUTE NAME | VALUE | ITEM NAME | ITEM VALUE |
| A:Amount | | NUMBER OF COPIES | |
| | 1-32767 | | 1-32767 COPIES |
| A:Rotate | | ROTATION | |
| | 1 | | 0° ROTATION |
| | 2 | | 90° ROTATION |
| | 3 | | 180° ROTATION |
| | 4 | | 270° ROTATION |
| ... | | ... | |
| | ... | | ... |
| | ... | | ... |

FIG.6C

| JDF OF COMPANY B | | JOB ATTRIBUTES WITHIN DFE | |
|---|---|---|---|
| ATTRIBUTE NAME | VALUE | ITEM NAME | ITEM VALUE |
| B:DeliveryAmount | | NUMBER OF COPIES | |
| | 1-32767 | | 1-32767 COPIES |
| B:AlternateRotation | | ROTATION | |
| | true | | |
| | false | | |
| B:Rotate | | | |
| | 1 | | 0° ROTATION |
| | 2 | | 90° ROTATION |
| | 3 | | 180° ROTATION |
| | 4 | | 270° ROTATION |
| ... | | ... | |
| | ... | | ... |
| | ... | | ... |

FIG.8A

| ITEMS | | |
|---|---|---|
| JOB INFORMATION | NUMBER OF COPIES | |
| | NUMBER OF PAGES | |
| | RIP CONTROL MODE (PAGE MODE OR SHEET MODE) | |
| EDIT INFORMATION | DIRECTION INFORMATION | |
| | PRINTING SURFACE INFORMATION | |
| | ROTATION | |
| | SCALING UP/DOWN | |
| | IMAGE POSITION | OFFSET |
| | | POSITIONAL ADJUSTMENT INFORMATION |
| | LAYOUT INFORMATION | CUSTOM IMPOSITION ARRANGEMENT |
| | | PAGE NUMBER |
| | | IMPOSITION INFORMATION |
| | | PAGE ORDER INFORMATION |
| | | CREEP POSITIONAL ADJUSTMENT |
| | MARGIN INFORMATION | |
| | CROP MARK INFORMATION | CENTER CROP MARK INFORMATION |
| | | CORNER CROP MARK INFORMATION |
| FINISHING INFORMATION | COLLATE INFORMATION | |
| | STAPLE/BIND INFORMATION | |
| | PUNCH INFORMATION | |
| | FOLDING INFORMATION | |
| | TRIMMING INFORMATION | |
| | OUTPUT TRAY INFORMATION | |
| | INPUT TRAY INFORMATION | |
| | COVER SHEET INFORMATION | |

FIG.8B

| ITEMS | | |
|---|---|---|
| JOB INFORMATION | NUMBER OF COPIES | |
| | NUMBER OF PAGES | |
| | RIP CONTROL MODE (PAGE MODE OR SHEET MODE) | |
| | RIP ENGINE IDENTIFICATION INFORMATION | |
| EDIT INFORMATION | DIRECTION INFORMATION | |
| | PRINTING SURFACE INFORMATION | |
| | ROTATION | |
| | SCALING UP/DOWN | |
| | IMAGE POSITION | OFFSET |
| | | POSITIONAL ADJUSTMENT INFORMATION |
| | LAYOUT INFORMATION | CUSTOM IMPOSITION ARRANGEMENT |
| | | PAGE NUMBER |
| | | IMPOSITION INFORMATION |
| | | PAGE ORDER INFORMATION |
| | | CREEP POSITIONAL ADJUSTMENT |
| | MARGIN INFORMATION | |
| | CROP MARK INFORMATION | CENTER CROP MARK INFORMATION |
| | | CORNER CROP MARK INFORMATION |
| FINISHING INFORMATION | COLLATE INFORMATION | |
| | STAPLE/BIND INFORMATION | |
| | PUNCH INFORMATION | |
| | FOLDING INFORMATION | |
| | TRIMMING INFORMATION | |
| | OUTPUT TRAY INFORMATION | |
| | INPUT TRAY INFORMATION | |
| | COVER SHEET INFORMATION | |

FIG.9

| | | ITEMS |
|---|---|---|
| INPUT/OUTPUT DATA TYPE INFORMATION | | |
| READING/WRITING POSITION SPECIFYING METHOD INFORMATION FOR INPUT/OUTPUT DATA | | |
| READING/WRITING POSITION INFORMATION FOR INPUT/OUTPUT DATA | | |
| READING/WRITING EXECUTION MODE INFORMATION FOR INPUT/OUTPUT DATA | | |
| UNIT INFORMATION (DIMENSIONS) | | |
| COMPRESSION METHOD INFORMATION FOR INPUT/OUTPUT DATA | | |
| RIP CONTROL MODE (PAGE MODE OR SHEET MODE) | | |
| INPUT /OUTPUT IMAGE INFORMATION PORTION | INFORMATION ABOUT OUTPUT IMAGE | IMAGE FORMAT TYPE |
| | | IMAGE FORMAT DIMENSIONS |
| | | IMAGE FORMAT RESOLUTION |
| | | IMAGE POSITION |
| | | COLOR SEPARATION INFORMATION |
| | | COLOR PLANE FIT POLICY INFORMATION |
| | | PLANE SHIFT INFORMATION |
| | | COLOR BIT NUMBER OF IMAGE FORMAT |
| | | IMAGE DIRECTION INFORMATION |
| | | IMAGE FORMATION POSITION INFORMATION |
| | | IMAGE FORMATION SIZE INFORMATION |
| | | IMAGE FORMATION METHOD INFORMATION |
| | | COLOR ICC INFORMATION |
| | | FONT SUBSTITUTION INFORMATION |
| | | IMAGE FORMATION ORIGIN INFORMATION |
| | | FLAT K BLACK INFORMATION |
| | | RENDERING INFORMATION |
| | INFORMATION ABOUT INPUT IMAGE | IMAGE FORMAT TYPE |
| | | IMAGE FORMAT DIMENSIONS |
| | | IMAGE FORMAT RESOLUTION |
| | | IMAGE POSITION |
| | | INPUT DATA |
| | | PAGE AREA INFORMATION |
| | | COLOR ICC INFORMATION |
| | INFORMATION ABOUT HANDLING OF IMAGE | SCALING OFFSET INFORMATION |
| | | OBJECT REGION INFORMATION |
| | | HALFTONE INFORMATION |
| | | SCALING ALGORITHM INFORMATION |
| INFORMATION ABOUT PDL | DATA AREA | |
| | SIZE INFORMATION | |
| | DATA ARRANGEMENT METHOD | |

FIG.10

| ITEMS | | |
|---|---|---|
| INPUT/OUTPUT DATA TYPE INFORMATION | | |
| READING/WRITING POSITION SPECIFYING METHOD INFORMATION FOR INPUT/OUTPUT DATA | | |
| READING/WRITING POSITION INFORMATION FOR INPUT/OUTPUT DATA | | |
| READING/WRITING EXECUTION MODE INFORMATION FOR INPUT/OUTPUT DATA | | |
| UNIT INFORMATION (DIMENSIONS) | | |
| COMPRESSION METHOD INFORMATION FOR INPUT/OUTPUT DATA | | |
| RIP CONTROL MODE (PAGE MODE OR SHEET MODE) | | |
| RIP ENGINE IDENTIFICATION INFORMATION | | |
| INPUT /OUTPUT IMAGE INFORMATION PORTION | INFORMATION ABOUT OUTPUT IMAGE | IMAGE FORMAT TYPE |
| | | IMAGE FORMAT DIMENSIONS |
| | | IMAGE FORMAT RESOLUTION |
| | | IMAGE POSITION |
| | | COLOR SEPARATION INFORMATION |
| | | COLOR PLANE FIT POLICY INFORMATION |
| | | PLANE SHIFT INFORMATION |
| | | COLOR BIT NUMBER OF IMAGE FORMAT |
| | | IMAGE DIRECTION INFORMATION |
| | | IMAGE FORMATION POSITION INFORMATION |
| | | IMAGE FORMATION SIZE INFORMATION |
| | | IMAGE FORMATION METHOD INFORMATION |
| | | COLOR ICC INFORMATION |
| | | FONT SUBSTITUTION INFORMATION |
| | | IMAGE FORMATION ORIGIN INFORMATION |
| | | FLAT K BLACK INFORMATION |
| | | RENDERING INFORMATION |
| | INFORMATION ABOUT INPUT IMAGE | IMAGE FORMAT TYPE |
| | | IMAGE FORMAT DIMENSIONS |
| | | IMAGE FORMAT RESOLUTION |
| | | IMAGE POSITION |
| | | INPUT DATA |
| | | PAGE AREA INFORMATION |
| | | COLOR ICC INFORMATION |
| | INFORMATION ABOUT HANDLING OF IMAGE | SCALING OFFSET INFORMATION |
| | | OBJECT REGION INFORMATION |
| | | HALFTONE INFORMATION |
| | | SCALING ALGORITHM INFORMATION |
| INFORMATION ABOUT PDL | DATA AREA | |
| | SIZE INFORMATION | |
| | DATA ARRANGEMENT METHOD | |

INFORMATION PROCESSING APPARATUS, INFORMATION PROCESSING METHOD, AND NON-TRANSITORY COMPUTER-READABLE RECORDING MEDIUM STORING COMPUTER-READABLE PROGRAM

CROSS-REFERENCE TO RELATED APPLICATIONS

The present application is a continuation application filed under 35 U.S.C. 111(a) claiming the benefit under 35 U.S.C. 120 of U.S. patent application Ser. No. 15/029,014 filed on Apr. 13, 2016, which is the National Stage of International Application No. PCT/JP2014/081675, filed on Nov. 25, 2014, which is based on and claims the benefit of priority to Japanese Priority Application No. 2013-248687, filed on Nov. 29, 2013, Japanese Priority Application No. 2014-054114, filed on Mar. 17, 2014, and Japanese Priority Application No. 2014-231952, filed on Nov. 14, 2014, the entire contents of which are hereby incorporated herein by reference.

TECHNICAL FIELD

The present invention relates to an information processing apparatus and the like that use a print job including print setting information and print data and generate drawing data.

BACKGROUND ART

There is what is called production printing for printing and binding a huge amount of commercial documents (see Patent Document 1, for example). Patent Document 1 discloses a printing system capable of notifying a user of whether a post process is available in consideration of an entire portion of the printing system.

In the production printing system, a printing process is often handled as a workflow. There is a trend of opening printing workflows. Through opening, it is possible for software (a workflow application described below) and printing devices of various companies to describe setting of print jobs in a main process of printing in a common description method. A standard format called Job Definition Format (JDF) is known as a format for describing an entire portion of the printing workflow.

The printing workflow has various types of processing such as creation of a document or contents, specification of a printing method, printing, and post processing. Although each process is performed by various workflow applications and printing devices, the JDF enables cooperation between the printing devices, printing process control, and the like irrespective of difference of the workflow applications and difference of manufacturers of the printing devices.

However, if the workflow application made by each software manufacturer has extended the JDF, a description specific to the workflow application may be included in the JDF. In this case, there may a situation where a workflow application or a printing device positioned downstream cannot analyze or process the JDF.

In order to solve such a problem, the workflow application or the printing device positioned downstream may convert a JDF created by the workflow application positioned upstream into a format that can be handled by the workflow application or the printing device positioned downstream (see Patent Document 2, for example). Patent Document 2 discloses a printing method, in which when a Personal Computer (PC) transmits print instruction information described in JDF codes to a printing device, the printing device obtains, from received print instruction information, an application name of an application program that created the print instruction information, transmits the application name to a server, and the server transmits JDF analysis data for the application name to the printing device.

Patent Document 1: Japanese Laid-Open Patent Application No. 2012-238188
Patent Document 2: Japanese Laid-Open Patent Application No. 2013-088992

SUMMARY OF INVENTION

Problem to be Solved by the Invention

However, in some cases, even if a JDF created by the workflow application positioned upstream is converted into a format that can be handled by the workflow application positioned downstream, output results may be different. In other words, the JDF is transmitted together with Page Description Language (PDL) as a print job from the workflow application positioned upstream to the workflow application or the printing device positioned downstream. In this case, even if the print job (JDF+PDL) has the same format among manufacturers, it poses a problem in that output results may be different because rendering engines in printing devices of these manufacturers are different.

In view of the above matter, it is a general object of the present invention to provide an information processing apparatus that reduces the difference of output results due to the difference of rendering engines among manufacturers.

Means to be Solve the Problem

According to an aspect of the invention, an information processing apparatus for generating drawing data by using printing data and print setting information is provided. The information processing apparatus includes a conversion unit that converts the print setting information into apparatus setting information; a plurality of drawing data generating units that generates the drawing data based on the printing data and the apparatus setting information; and a generating unit controller that analyzes the apparatus setting information to select one of the drawing data generating units and controls the selected drawing data generating unit in a control procedure corresponding to the selected drawing data generating unit.

The present invention is capable of providing an information processing apparatus that reduces the difference of output results due to the difference of rendering engines among manufacturers.

BRIEF DESCRIPTION OF DRAWINGS

FIG. 5A is an example of a diagram illustrating a part of a JDF description;

FIG. 5B is an example of a diagram illustrating a part of a JDF description;

FIG. 5C is an example of a diagram illustrating a part of a JDF description;

FIG. 6A is a diagram showing an example of a conversion table;

FIG. 6B is a diagram showing an example of a conversion table;

FIG. 6C is a diagram showing an example of a conversion table;

FIG. 8A is an example of a diagram schematically illustrating an example of "job attributes within DFE";

FIG. 8B is an example of a diagram schematically illustrating an example of "job attributes within DFE";

FIG. 9 is a diagram showing an example of an "RIP Parameter List";

FIG. 10 is a diagram showing an example of an "RIP Parameter List";

BEST MODE FOR CARRYING OUT THE INVENTION

In the following, embodiments for carrying out the present invention are described with reference to drawings.

Figure 1:
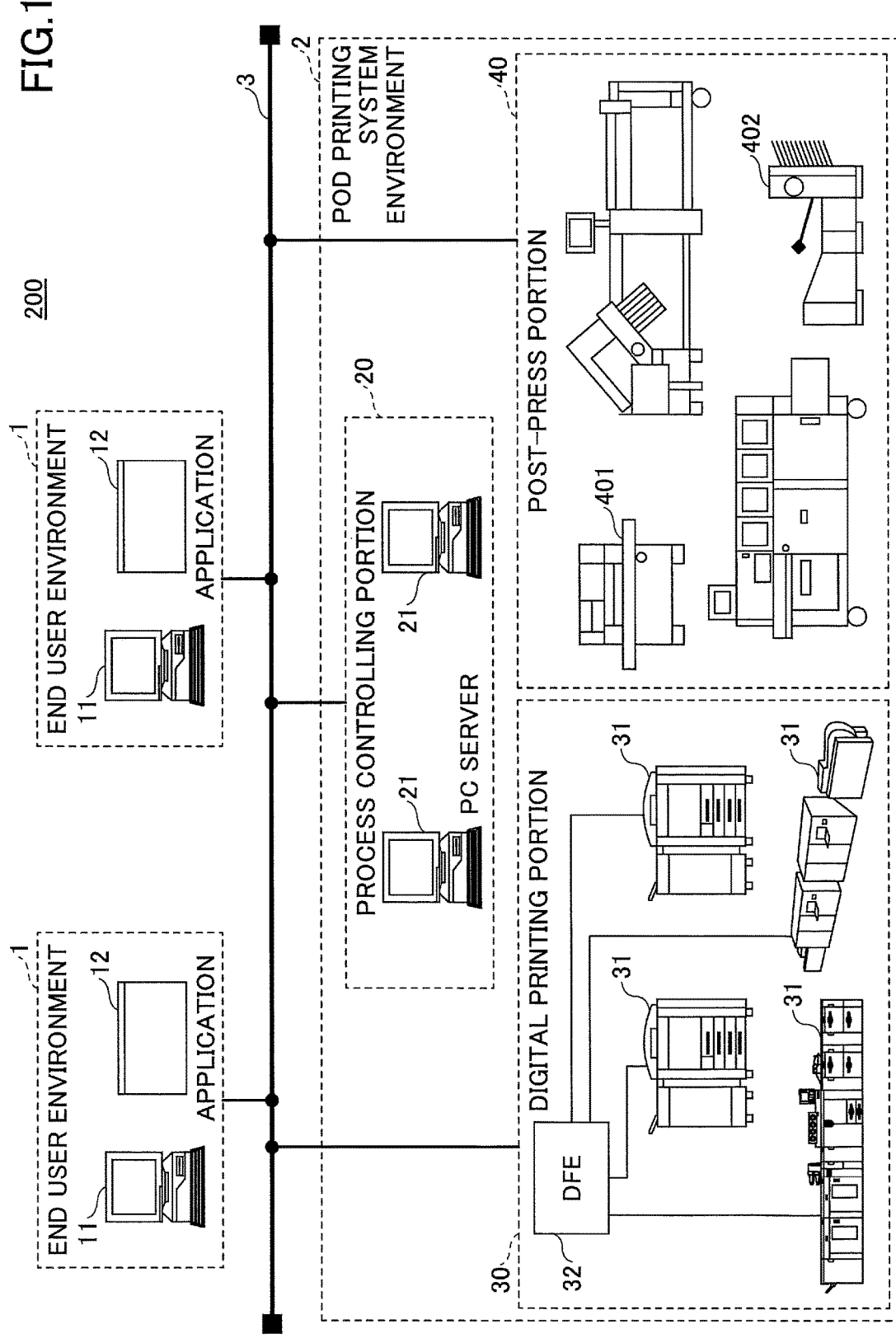
FIG. 1 is an example of a diagram showing an entire configuration of a printing system according to an embodiment.

FIG. 1 is an example of a diagram showing an entire configuration of a printing system 200 according to an embodiment. The printing system 200 according to the present embodiment includes at least one end user environment 1 and a Print On Demand (POD) printing system environment 2 connected via a network 3 such as a LAN or the Internet.

In the end user environment 1, a client PC 11 is disposed. A workflow application for POD printing operation (hereafter simply referred to as application) 12 is installed on the client PC 11 and is capable of generating a print job when a user operation is received.

The application 12 can perform an aggregate printing function (Number Up impose function) to attach a plurality of logical page images to a sheet surface and an image editing function to add a header, a footer, a page number, and the like. Further, the application 12 can specify a perforation (punch) instruction for bookbinding and an instruction such as a staple fixation (staple) instruction. These instructions or settings are described in a JDF. The JDF is also referred to as a job ticket, an operation instruction, a printing instruction, and the like.

The POD printing system environment 2 includes a process controlling portion 20, a digital printing portion 30, and a post-press portion 40 connected via the network 3. In the POD printing system environment 2, the process controlling portion 20 sends an instruction to perform an operation to each of the digital printing portion 30 and the post-press portion 40 and manages workflows of POD printing system environment 2 in an integrated manner.

The process controlling portion 20 receives a print job (Job Definition Format (JDF) and Page Description Language (PDL)) from the end user environment 1 and stores the print job. The JDF is an example of print setting information in the Claims and the PDL is an example of printing data in the Claims. While the PDL is a language for specifying drawing contents of a page image (rasterized image), the PDL here means data described in the PDL. Examples of the PDL include Portable Document Format (PDF), PostScript, PCL, RPDL, and the like.

The process controlling portion 20 also assembles operations in each process as a workflow based on a print job from the end user environment 1 and efficiently schedules operations of the digital printing portion 30, the post-press portion 40, and each operator. When an error occurs in automatic operation, the process controlling portion 20 can notify the operator where necessary. In general, the process controlling portion 20 is configured to include at least one PC server 21.

The process controlling portion 20 transmits a print job to the digital printing portion 30 to cause the digital printing portion 30 to perform printing. Further, printed matter is conveyed to the post-press portion 40 and the post-press portion 40 performs bookbinding, for example, by an instruction from the process controlling portion 20. The print job may be transmitted to the post-press portion 40 directly from the digital printing portion 30.

The digital printing portion 30 is configured to include various types of printers 31 (printer devices such as a printer for production, a high-speed color inkjet printer, and a color/monochrome MFP). In the digital printing portion 30, a Digital Front End (DFE) 32 is disposed. The DFE 32 is also referred to as a printer controlling device and controls printing by the printers 31. The DFE 32 may be separate from the printers 31 as shown in the drawing or may be integrated with each of the printers 31. When the DFE 32 obtains a print job from the process controlling portion 20, the DFE 32 uses a JDF and a PDL to generate raster data (an example of drawing data in the Claims) by which the printer 31 forms an image using a toner image or ink, and the DFE 32 transmits the raster data to the printer 31.

The digital printing portion 30 includes various types of printer 31. The digital printing portion 30 may include the printer 31 directly connected to a finisher (post-processing device) for performing post processing such as folding, saddle stitching bookbinding, case binding, and punching on printed recording paper.

The post-press portion 40 is configured to include post-processing devices such as a folder, a saddle stitching bookbinder, a case binder, a cutter, an inserter, a collator, and the like in accordance with an operation instruction of printed matter (post-press job) received from the process controlling portion 20. The post-press portion 40 performs finishing processing such as folding, saddle stitching bookbinding, case binding, cutting, inserting, collating, and the like on printed matter output from the digital printing portion 30. The post-press portion 40 includes post-processing devices for performing post processing after digital printing such as a stapler 401, a puncher 402, and the like.

An end user in the end user environment 1 uses the application 12 for POD printing operations from the client PC 11 to cause image editing, imposition, text insertion, post processing, and the like to be performed and transmits a print job to the process controlling portion 20 in the POD printing system environment 2.

In accordance with a JDF, the PC server 21 of the process controlling portion 20 instructs the digital printing portion 30 to perform printing and instructs the post-press portion 40 to perform a post process.

(Hardware Configuration)

In the present embodiment, the process controlling portion 20 receives a print job created by the end user environment 1 and transmits the print job to the DFE 32. Accordingly, the process controlling portion 20 or the DFE 32 has a function of converting the print job, controlling a plurality of RIP engines described later, and the like of the present embodiment. However, the end user environment 1 may have the function of converting the print job or controlling the RIP engines, for example. Further, other than these cases, an information processing device connected to the network 3, for example, may include the function of converting the print job or controlling the plurality of RIP engines. In the following, the present embodiment is described on the assumption that the DFE 32 has the function of converting the print job and controlling the plurality of RIP engines.

Figure 2:
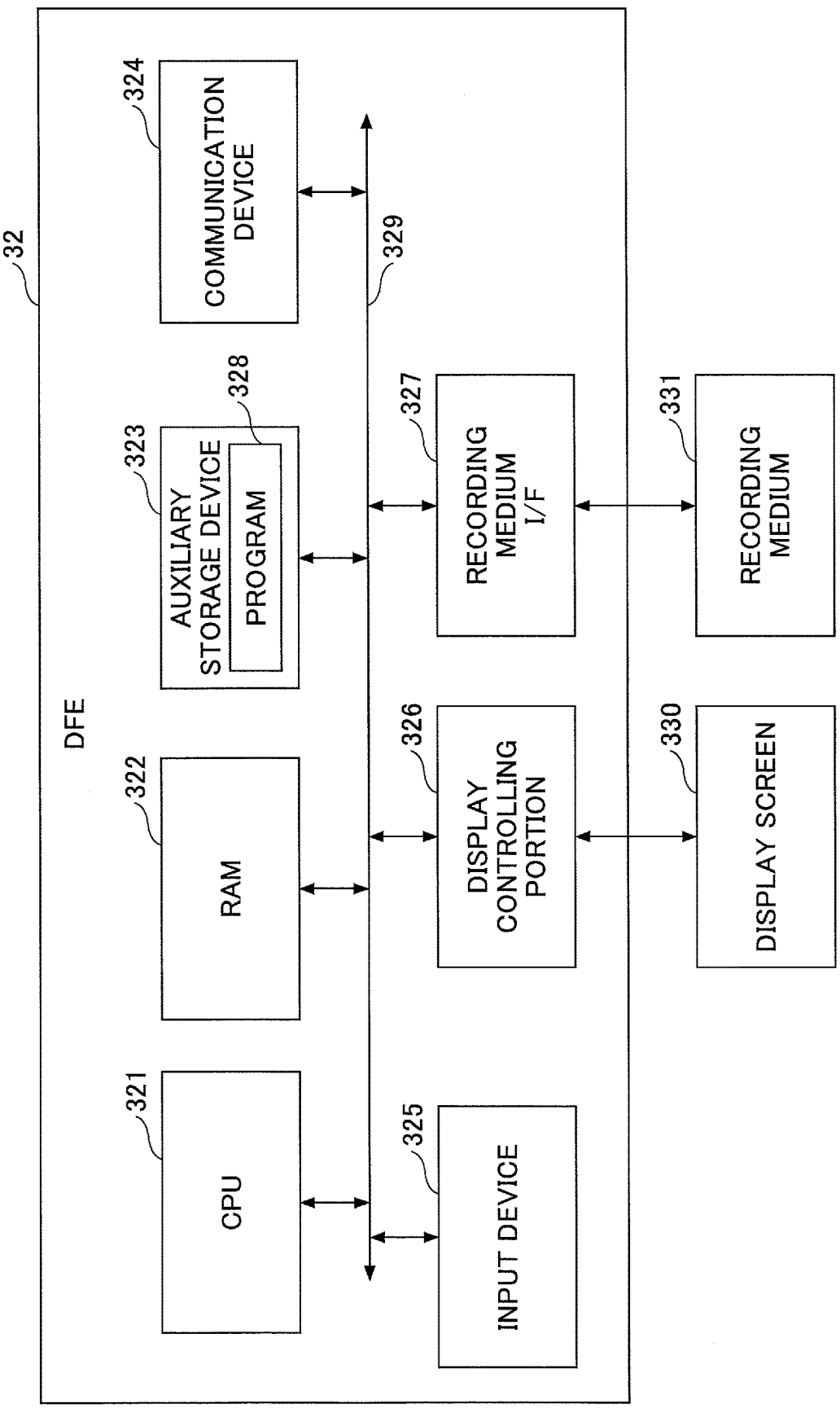
FIG. 2 is an example of a hardware configuration diagram of a DFE.

FIG. 2 is an example of a hardware configuration diagram of the DFE 32. The DFE 32 is realized by a hardware configuration as shown in FIG. 2, for example. In other words, the DFE 32 has a function of an information processing device (computer). The DFE 32 includes a CPU 321, a RAM 322, an auxiliary storage device 323, a communication device 324, an input device 325, a display controlling portion 326, and a recording medium I/F 327 interconnected via a bus 329.

The CPU 321 controls the entire hardware portion of the DFE 32 by executing a program with the RAM 322 functioning as working memory. The auxiliary storage device 323 is a non-volatile memory such as a Hard Disk Drive (HDD) or a Solid State Drive (SSD). The auxiliary storage device 323 stores a program 328 that has a function of converting a print job.

The communication device 324 is a modem, a LAN card, or the like and is connected to the network 3 to communicate with the end user environment 1, the process controlling portion 20, or the post-press portion 40. The communication device 324 also communicates with the printers 31. The input device 325 is a keyboard or a mouse, for example, and accepts a user operation. The display controlling portion 326 is connected to a display screen 330 and performs rendering on the display screen 330 by an instruction from the CPU 321. The display screen 330 may include a touch panel.

A portable recording medium can be attached to or removed from the recording medium I/F 327. The recording medium I/F 327 writes data in a recording medium 331 by an instruction from the CPU 321 or reads out data from the recording medium 331. The recording medium 331 may be one of various types including a medium for optical, electric, or magnetic recording such as a CD-ROM, an optical disk, a USB memory, and an SD card and a semiconductor memory for electrically recording information such as a flash memory.

The program 328 is stored in the recording medium 331 and delivered or the program 328 is downloaded from a server via the network 3.

Hardware configurations of the client PC 11 in the end user environment 1 and the PC server 21 in the process controlling portion 20 can be realized by the same configuration as in FIG. 2.

(Functional Block Diagram)

Figure 3:
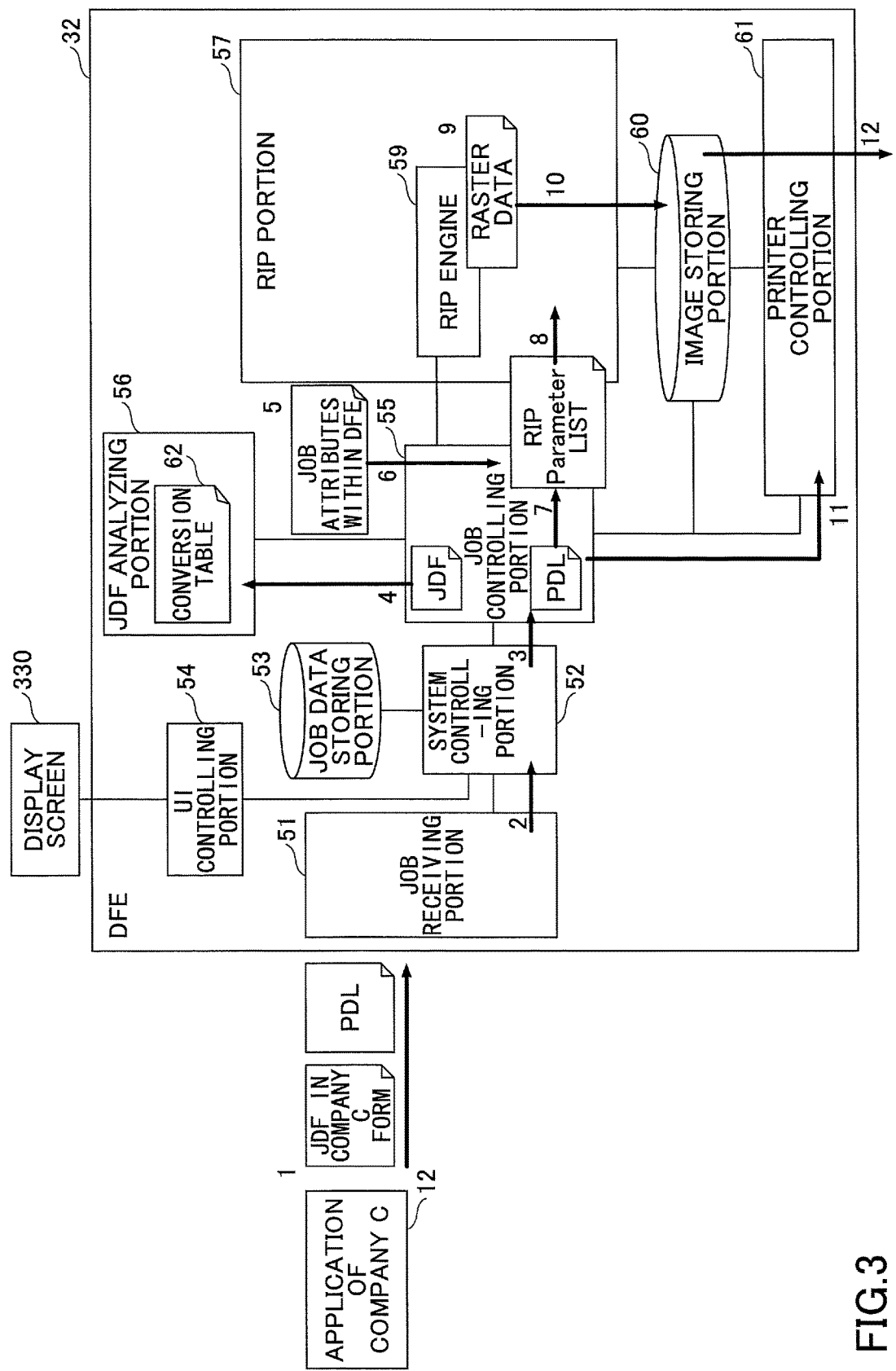
FIG. 3 is an example of a functional block diagram of a DFE of related art for comparison.

FIG. 3 is an example of a functional block diagram of a DFE 32 of related art for comparison. The DFE 32 performs job control, Raster Image Processor (RIP) control, and printer control in a workflow. In this manner, the DFE 32 operates as a server to provide the end user environment 1 or the process controlling portion 20 with a main function of printing. The job control refers to control on a series of procedures of a print job such as receiving the print job, analyzing a JDF, creating raster data, printing by the printer 31, and the like. The RIP control refers to control to create an "RIP Parameter List" and cause an RIP engine 59 to create raster data after "job attributes within DFE" described below are created. The "job attributes within DFE" are an example of apparatus setting information in the Claims and the "RIP Parameter List" is an example of control data in the Claims.

The "RIP" is an acronym of "Raster Image Processor" and refers to a dedicated IC for generating raster data and to generation (rendering) of raster data.

The printer control refers to control to transmit the raster data and a part of the "job attributes within DFE" (Finishing information described below) to the printer 31 and to cause the printer 31 to perform printing.

The DFE 32 supports the application 12 of company C and can normally perform a print job (JDF and PDL) in a company C form. In the following, a procedure of printing is described.

1. A job receiving portion 51 receives a print job (PDL+JDF) in the company C form from the application 12 operating in the end user environment 1.

2. The job receiving portion 51 outputs the print job to a system controlling portion 52.

3. The system controlling portion 52 temporarily stores the print job in a job data storing portion 53 depending on setting and subsequently outputs the print job to a job controlling portion 55 or the system controlling portion 52 directly outputs the print job to the job controlling portion 55.

4. The job controlling portion 55 transmits a JDF within the print job to a JDF analyzing portion 56 and also outputs a JDF conversion request to the JDF analyzing portion 56.

5. The JDF analyzing portion 56 converts the JDF in the company C form into "job attributes within DFE" that can be handled by the DFE 32. The "job attributes within DFE" are obtained by converting each attribute of the print job into a form handled by the DFE 32 of company C, for example, as will be described below.

6. The JDF analyzing portion 56 transmits the "job attributes within DFE" resulting from the conversion to the job controlling portion 55.

7. The job controlling portion 55 generates an "RIP Parameter List" from the "job attributes within DFE" and the "PDL". The "RIP Parameter List" includes a set of information necessary for RIP processing by an RIP engine 59. The job controlling portion 55 determines an instruction for the RIP processing for the RIP engine 59 from information in the "RIP Parameter List". This instruction is called an RIP command.

8. The job controlling portion 55 initializes the RIP engine 59, determines RIP commands using the information necessary for RIP processing described in the "RIP Parameter List", and outputs the RIP commands to the RIP engine 59.

9. The RIP engine 59 performs a drawing process in accordance with the RIP commands. As a result of the drawing process, raster data (bitmap data) is generated in accordance with an output resolution of the printer 31.

10. The RIP engine 59 stores the raster data in an image storing portion 60 after the drawing process and sends notification of an end of RIP to the job controlling portion 55.

11. The job controlling portion 55 transmits Finishing information from the "job attributes within DFE" to a printer controlling portion 61 and requests printing.

12. The printer controlling portion 61 receives the request of printing from the job controlling portion 55, checks an image stored in the image storing portion 60, and controls the printer 31 in accordance with the Finishing information to perform printing.

(a1) In this manner, since the DFE 32 can analyze the JDF in the company C form, it is possible to convert the JDF into "job attributes within DFE" and rasterize by the RIP engine 59. However, if the JDF is not in the company C form, the JDF analyzing portion 56 may not appropriately analyze the JDF.

(a2) Further, even if it is possible to analyze a JDF not in the company C form, depending on workflow applications of other companies, a print job including a JDF and a PDL may be different from a print job of company C. In this case, the DFE 32 may not perform normal printing.

(a3) Further, even if different print jobs are supported, output results may be different due to difference in processing of the RIP engine 59 although the PDL in a print job is of the same PDL type (PDF, PostScript, or the like).

(a4) For example, even if it is possible to eliminate the difference of output results by installing the RIP engine 59 of each company, the RIP engine 59 of each company generally has a different sequence for control, so that it is impossible to reduce the difference of output results by only installing the RIP engine 59 of each company.

(DFE in the Present Embodiment)

Figure 4:
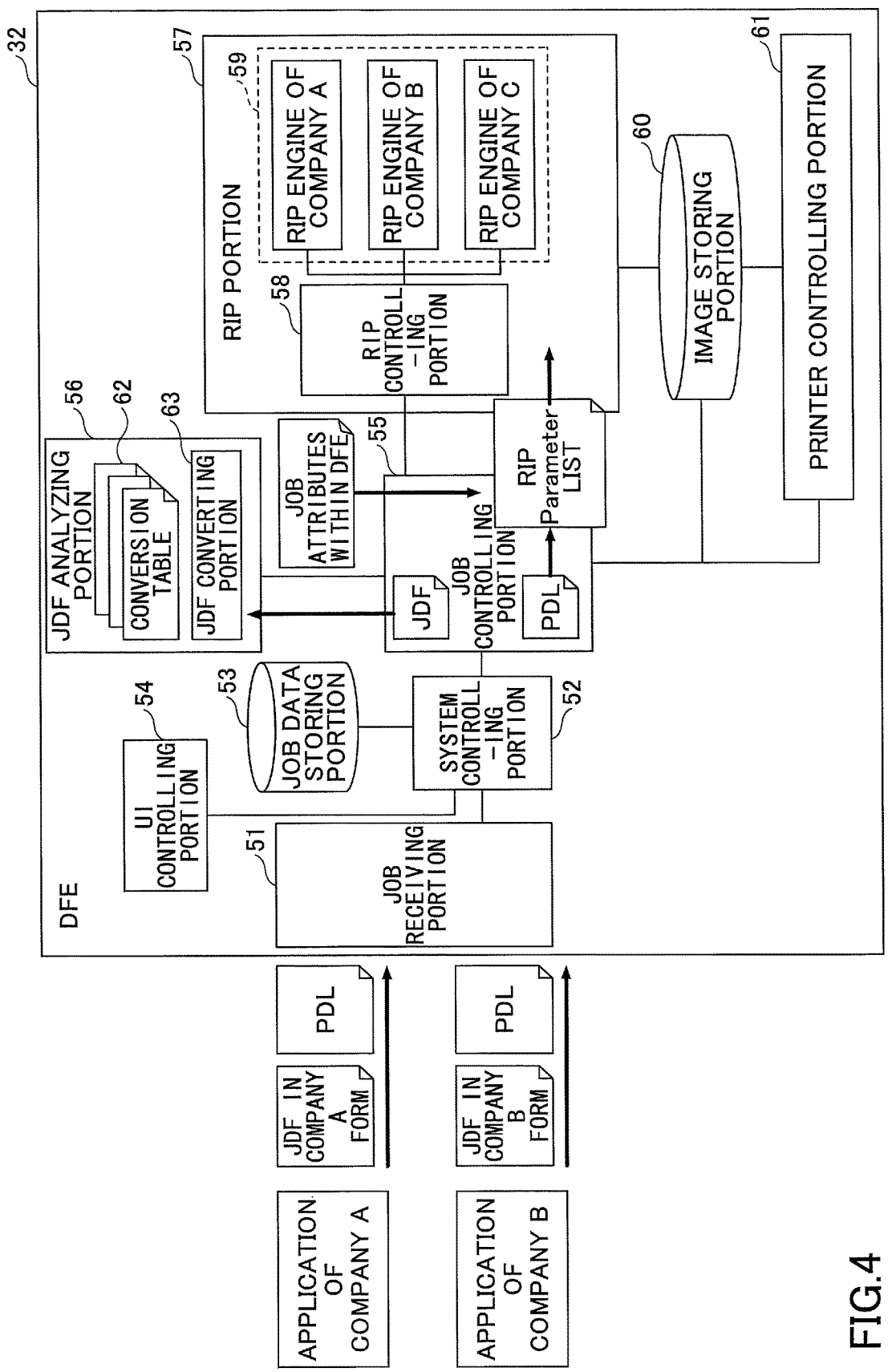
FIG. 4 is an example of a functional block diagram of a DFE according to an embodiment.

FIG. 4 is an example of a functional block diagram of the DFE 32 according to the present embodiment. The DFE 32 of the present embodiment operates as follows as main features thereof in order to solve the above-mentioned problem.

(b1) A JDF converting portion 63 of the JDF analyzing portion 56 converts a JDF in each company's form into "job attributes within DFE" that can be handed by the DFE 32 of company C. In accordance with this, it is possible to solve (a1).

Further, when the JDF is converted into the "job attributes within DFE", a "RIP control mode" is set in the "job attributes within DFE". Specifically, a "Page Mode" or a "Sheet Mode" is set in the "RIP control mode".

The "Page Mode" causes RIP processing for each page and generates raster data aggregated in a single sheet.

The "Sheet Mode" causes RIP processing for each part (cell) of a single sheet in which a plurality of pages has been aggregated and generates raster data.

(b2) An RIP controlling portion 58 is disposed on an RIP portion 57. The RIP controlling portion 58 controls the RIP engine 59 in accordance with the "RIP control mode". Accordingly, an optimum sequence for a print job is selected by the "RIP control mode". In accordance with this, it is possible to solve (a2).

(b3) In the RIP portion 57, one of the RIP engines 59 is disposed for each software manufacturer (for each RIP engine, identification information is described below) of an application. In accordance with this, it is possible to prevent the problem (a3) where output results may be different due to difference in processing of the RIP engine 59 although the PDL in a print job is of the same PDL type.

(b4) The RIP controlling portion 58 determines the RIP engine 59 to use among a plurality of RIP engines 59 and controls the RIP engine 59 in accordance with a sequence held in advance for each RIP engine 59. In accordance with this, it is possible to solve (a4).

In the following, a description is given based on FIG. 4. The DFE 32 includes the job receiving portion 51, the system controlling portion 52, a UI controlling portion 54, the job controlling portion 55, the JDF analyzing portion 56, the RIP portion 57, the RIP controlling portion 58, the RIP engine 59, and the printer controlling portion 61. These are realized when the CPU 321 executes the program 328 and cooperates with various types of hardware shown in FIG. 2. The DFE 32 further includes the job data storing portion 53 and the image storing portion 60 configured in the auxiliary storage device 323, the RAM 322, the recording medium 331, or the like.

The job receiving portion 51 receives a print job from the application 12 or the like via the network 3. For example, the job receiving portion 51 extracts a JDF and a PDL from received data and outputs them to the job controlling portion 55. Further, the job receiving portion 51 associates the print job with a unique job number, a reception date and time, an end date and time, a status, and the like and stores them in a log, for example. Other than being input from the application 12, the print job may be input when the job receiving portion 51 reads out the print job stored in a portable memory. In the present embodiment, the JDF is assumed to be included in the print job. If the JDF is not included, the job receiving portion 51 creates a dummy JDF and defines setting of a print job necessary to process a job within the DFE 32.

The system controlling portion 52 stores the received print job in the job data storing portion 53 or outputs the received print job to the job controlling portion 55. For example, if the DFE 32 is set in advance so that a print job is stored in the job data storing portion 53, the system controlling portion 52 stores the print job in the job data storing portion 53. Further, the JDF may describe whether to store a print job in the job data storing portion 53.

If a user operates such that contents of the print job stored in the job data storing portion 53 are displayed on the display screen 330, for example, the system controlling portion 52 outputs the JDF from the job data storing portion 53 to the UI controlling portion 54. If the user changes the JDF, the UI controlling portion 54 receives changed contents and the system controlling portion 52 stores the changed JDF in the job data storing portion 53 anew.

If the system controlling portion 52 receives an instruction to perform the print job from the user, the end user environment 1, or the process controlling portion 20, the system controlling portion 52 outputs the print job stored in the job data storing portion 53 to the job controlling portion 55. Further, if a printing time is set in the JDF, the system controlling portion 52 reads out the print job stored in the job data storing portion 53 and outputs the print job to the job controlling portion 55 at the printing time.

The job data storing portion 53 is a storage area for storing a print job in this manner and is disposed in the auxiliary storage device 323 of the DFE 32 or the recording medium 331. The job data storing portion 53 may be disposed in a storage device on a network.

The UI controlling portion 54 interprets a JDF and displays contents of a print job on the display screen 330. The UI controlling portion 54 can display raster data generated by the RIP engine 59 on the display screen 330.

The job controlling portion 55 causes the RIP controlling portion 58 to generate raster data and causes the printer controlling portion 61 to perform printing. Specifically, the job controlling portion 55 first transmits the JDF of the print job to the JDF analyzing portion 56 and outputs a JDF converting request to the JDF analyzing portion 56.

The JDF analyzing portion 56 changes the JDF in the company C form to "job attributes within DFE" of company C as performed in related art. The JDF converting portion 63 of the JDF analyzing portion 56 analyzes a description of the JDF to determine a software manufacturer (an example of an original generator in the Claims) of the application 12 that created the JDF. The determination of the software manufacturer that created the JDF means substantially the same as determination of the RIP engine 59 by which the print job is assumed to be rendered. The JDF converting portion 63 uses a conversion table 62 created on the basis of correspondence between a JDF in each company's form and the "job attributes within DFE" of company C and changes the JDF dependent on the software manufacturer of the application 12 to "job attributes within DFE" of company C. The conversion table 62 is created for each software manufacturer.

The JDF converting portion 63 sets the "RIP control mode ("Page Mode" or "Sheet Mode")" in the "job attributes within DFE". In other words, the JDF converting portion 63 determines the JDF to be in a company A or B form other than company C and sets the "RIP control mode" suitable for the print job created by the software manufacturer of the application 12. Whether a print job of each company is created in the "Page Mode" or the "Sheet Mode" has been examined in advance. In the present embodiment, it is assumed that company C handles setting of aggregate printing of a print job in the "Page Mode".

Further, the JDF converting portion 63 may set "RIP engine identification information" in the "job attributes within DFE". In other words, the JDF converting portion 63 determines the JDF to be in the company A or B form other than company C and sets "RIP engine identification information" suitable for each company.

The job controlling portion 55 obtains the "job attributes within DFE" in accordance with this, converts the "job attributes within DFE" and a PDL into an "RIP Parameter List" and outputs the print job as the "RIP Parameter List" to the RIP controlling portion 58. The job controlling portion 55 causes the RIP controlling portion 58 to perform a drawing process using the RIP engine 59. In other words, the job controlling portion 55 may create the "RIP Parameter List" from the "job attributes within DFE" and the PDL in the same manner as a case where the RIP controlling portion 58 is removed. The "RIP Parameter List" includes the "RIP control mode".

Further, the job controlling portion 55 always operates in accordance with a sequence in the "Page Mode". The job controlling portion 55 always operates in a company's own control mode, so that the job controlling portion 55 does not need to be changed to support a print job (JDF and PDL) of an other company. The job controlling portion 55 can reduce development costs or a development period by avoiding a change to support a print job of an other company in order to provide main functions when the print job is performed.

The RIP portion 57 includes the RIP controlling portion 58 and the RIP engines 59 and generates raster data using them. One of the RIP engines 59 is prepared for each software manufacturer of an application. In addition, even if software manufacturers are different, it is possible to use the same RIP engine 59 as long as the RIP engine 59 that one software manufacturer uses is the same as the RIP engine 59 of another software manufacturer. In the drawing, three RIP engines 59 are arranged but the number of the RIP engines 59 may be at least two or four or more.

The RIP controlling portion 58 analyzes information in the "RIP Parameter List" and determines an RIP engine to use from a plurality of the RIP engines 59. The determination of the RIP engine is based on at least one item in the "RIP Parameter List" or based on "RIP engine identification information" shown in the "RIP Parameter List".

The RIP controlling portion 58 stores a sequence for control for each of the plurality of RIP engines 59. Accordingly, the job controlling portion 55 may output the "RIP Parameter List" to the RIP controlling portion 58 irrespective of the RIP engine 59 to use.

The RIP controlling portion 58 refers to the "RIP Parameter List" and transmits an RIP command to the RIP engine 59. If the "RIP control mode" is "Sheet Mode", the RIP controlling portion 58 outputs the RIP command to the RIP engine 59 in accordance with the "Sheet Mode". In accordance with this, it is possible to eliminate a difference of print jobs.

The RIP engine 59 is a rendering engine and generates raster data by rasterizing in accordance with the RIP command. As mentioned above, the plurality of RIP engines 59 corresponding to software manufacturers of applications is present.

The image storing portion 60 is a storage unit that stores generated raster data. The image storing portion 60 is installed in the auxiliary storage device 323, for example.

The printer controlling portion 61 is connected to the printer 31. The printer controlling portion 61 performs printing by reading out the raster data stored in the image storing portion 60 and transmitting the raster data to the printer 31. The printer controlling portion 61 also performs a finishing process on the basis of the Finishing information obtained from the job controlling portion 55.

(Information about Other Companies within JDF)

A JDF is described in Extensible Markup Language (XML). The XML is a standard of structured text for providing a meaning to tags and structuring a document.

FIGS. 5A-C are examples of a diagram illustrating a part of a JDF description. FIG. 5A describes contents of an instruction for a print job.

"JDF xmlns="http://www.CIP4.org/JDFSchema_1_1"" indicates a JDF ticket compliant with CIP4.

"xmlns:C="www.ccc.com/schema/ccc"" indicates a JDF tag definition independently extended by each printing company or vendor which is not compliant with CIP 4. In this example, any tag starting with "C:" within a JDF is an extended tag.

"ResourcePool" defines a collection of attributes to realize printing.

"LayoutPreparationParams" is one of attributes defined in the ResourcePool and defines attributes related to imposition.

"ResourceLinkPool" defines a collection of references to attributes commonly used within the ResourcePool for specific ranges if attributes are different in the ranges within a job such as pages.

"ComponentLink" is one of definitions of references within the "ResourceLinkPool" and specifies a reference of an attribute related to an output product and information.

"Amount" specifies a number of copies.

"Rotate" specifies a rotation angle for an image.

If a JDF shown in FIG. 5A is created by the application 12 of company C, the DFE 32 of company C can correctly analyze the JDF. By contrast, as shown in FIGS. 5B and C, a company of the application 12 may extend the JDF.

FIG. 5B is an example of expansion by company A and FIG. 5C is an example of expansion by company B. In FIG. 5B, "xmlns:A="www.aaa.com/schema/aaa"" indicates that any tag starting with "A:" within the JDF is an extended tag of company A. In FIG. 5C, "xmlns:B="www.bbb.com/schema/bbb"" indicates that any tag starting with "B:" within the JDF is an extended tag of company B.

Accordingly, the JDF converting portion 63 can identify a software manufacturer of the application 12 that created the JDF by referring to these descriptions of the JDF. It is possible to use the conversion table 62 mentioned below depending on a software manufacturer of the application 12 and convert the JDF into "job attributes within DFE" that can be handled by the DFE 32 of company C.

(Creation of Job Attributes within DFE)

Figure 7A:
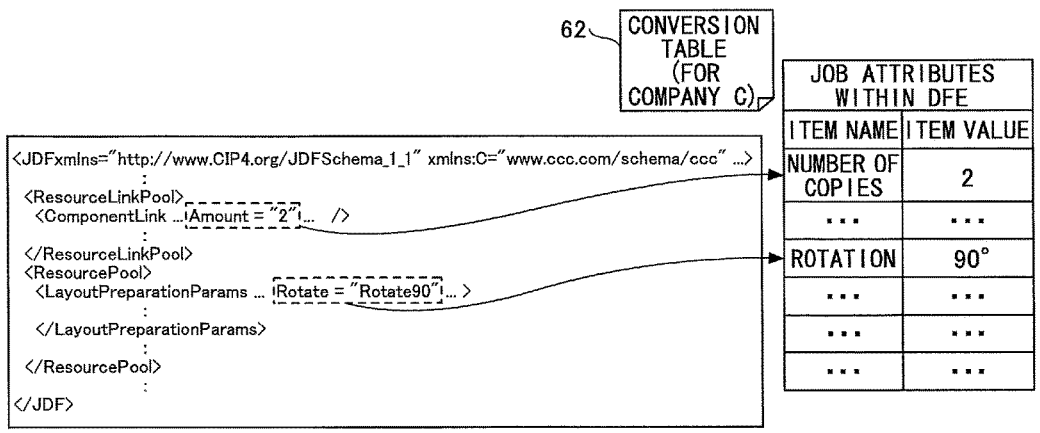
FIG. 7A is an example of a diagram illustrating creation of "job attributes within DFE"
Figure 7B:
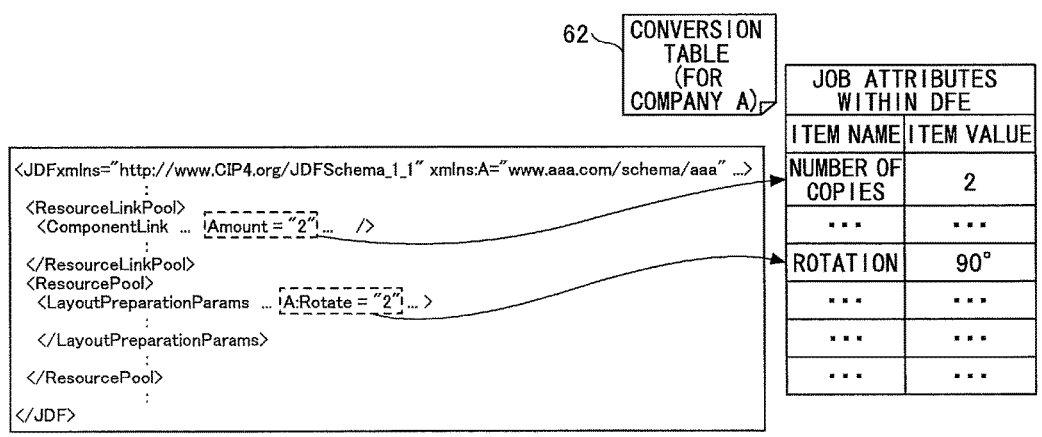
FIG. 7B is an example of a diagram illustrating creation of "job attributes within DFE"
Figure 7C:
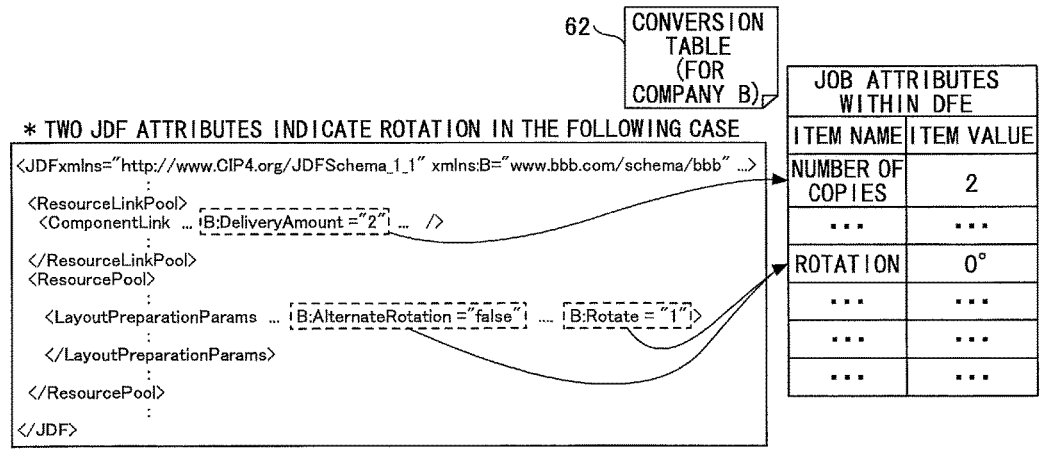
FIG. 7C is an example of a diagram illustrating creation of "job attributes within DFE"

Creation of "job attributes within DFE" is described with reference to FIGS. 6A-C and 7A-C. FIGS. 6A-C show examples of the conversion table 62. FIGS. 7A-C are examples of a diagram illustrating creation of "job attributes within DFE". The JDF analyzing portion 56 converts a JDF in the company C form into "job attributes within DFE" in the same manner as in related art. The conversion is performed, for example, by referring to the conversion table 62 that associates an attribute within a tag of the JDF with an item of the "job attributes within DFE" and placing an attribute value of the JDF as an item value of the "job attributes within DFE". The conversion tables 62 on FIGS. 7A-C are the conversion tables shown in FIGS. 6A-C. FIG. 6A is shown in FIG. 7A, FIG. 6B is shown in FIG. 7B, and FIG. 6C is shown in FIG. 7C.

FIG. 6A shows an example of a conversion table of company C. The conversion table of company C associates a value of an attribute name "Amount" with an item value of an item name "the number of copies" and associates a value or an attribute name "Rotate" with an item value of an item name "rotation".

When the JDF converting portion 63 identifies a software manufacturer (namely, an RIP engine assumed to process a print job) that created the print job as mentioned above, the JDF converting portion 63 uses the conversion table 62 for each software manufacturer to convert the JDF into the "job attributes within DFE".

The JDF converting portion 63 stores the conversion table 62 of company A and the conversion table 62 of company B in advance. FIG. 6B shows the conversion table 62 of company A and FIG. 6C shows the conversion table 62 of company B. The JDF converting portion 63 detects a description that specifies an extended tag from a JDF, identifies a manufacturer of the application 12, and uses the conversion table 62 for each manufacturer as mentioned above.

It is possible to convert the JDF in the company A or B form in the same manner as in a JDF in the company C form. The conversion table of company A associates a value of an attribute name "A:Amount" with an item value of an item name "the number of copies" and associates a value or an attribute name "A:Rotate" with an item value of an item name "rotation". The conversion table of company B associates a value of an attribute name "B:DeliveryAmount" with an item value of an item name "the number of copies" and associates a value or an attribute name "B:Rotate" with an item value of an item name "rotation". In the conversion table of company B, rotation is enabled only if a value of an attribute name "B:AlternateRotation" is "false". If the JDF is determined to be in the company A or B form, it is possible to create "job attributes within DFE" in the same manner as in a JDF in the company C form.

If the JDF converting portion 63 determines that a form of a print job in aggregate printing is created by the application 12 of a company different from its own company (company C), the JDF converting portion 63 sets "Sheet Mode" in an item "RIP control mode" of the "job attributes within DFE". If the application 12 is made by its own company or the form of a print job in aggregate printing is created by an application of the same company (company C), the JDF converting portion 63 sets "Page Mode" in the item "RIP control mode". Accordingly, the RIP controlling portion 58 can control an RIP command to be output to the RIP engine 59 in accordance with the "RIP control mode".

The "RIP control mode" may be set if the form of a print job in aggregate printing is not created by the application 12 of a company different from its own company (company C) but created by the application 12 and aggregate printing for two or more pages is actually set in a JDF.

In this manner, if the JDF converting portion 63 creates the "job attributes within DFE", descriptions such as "xmlns:A="www.aaa.com/schema/aaa"", "xmlns:B="www.bbb.com/schema/bbb"", a tag starting with "A:" ("A:Amount", "A:Rotate"), and a tag starting with "B:" ("B:DeliveryAmount", "B:Rotate") are included or can be converted to be included in the "job attributes within DFE". Further, information about such descriptions can be included in the "RIP Parameter List". In accordance with this, the RIP controlling portion 58 can detect these descriptions from the "RIP Parameter List" and select a single RIP engine 59.

Further, the JDF converting portion 63 may set the "RIP engine identification information" directly in the "job attributes within DFE" as in the "RIP control mode". In this case, a company name such as company A, company B, or company C is set or an ID (identification information) specific to company A, company B, or company C is set, for example. The specific ID (identification information) is an example of specified information in the Claims.

FIG. 8A is an example of a diagram schematically illustrating an example of "job attributes within DFE". The "job attributes within DFE" is substantially divided into "Job information" related to performing a job, "Edit information" related to raster data, and "Finishing information" related to a finishing process.

In the Job information, an item "number of copies" specifies a number of copies of a print job.

In the Job information, an item "number of pages" specifies a number of pages included in the print job.

In the Job information, an item "RIP control mode" specifies a control mode of an RIP engine by the RIP controlling portion 58.

In the Edit information, an item "direction information" specifies a direction of printing.

In the Edit information, an item "printing surface information" specifies a printing surface.

In the Edit information, an item "rotation" specifies a rotation angle of a page.

In the Edit information, an item "scaling up/down" specifies scaling and magnification.

In the Edit information, an item "image position: offset" specifies an offset of an image.

In the Edit information, an item "image position: positional adjustment information" specifies positional adjustment of an image.

In the Edit information, an item "layout information: custom imposition arrangement" specifies arrangement of a custom surface.

In the Edit information, an item "layout information: page number" specifies a page number of a single sheet.

In the Edit information, an item "layout information: imposition information" specifies information about surface arrangement.

In the Edit information, an item "layout information: page order information" specifies information about order of pages to be printed.

In the Edit information, an item "layout information: creep positional adjustment" specifies information about adjustment of a creep position.

In the Edit information, an item "margin information" specifies information about a margin such as a fit box or a gutter.

In the Edit information, an item "crop mark information: center crop mark information" specifies information about a center crop mark.

In the Edit information, an item "crop mark information: corner crop mark information" specifies information about a corner crop mark.

In the Finishing information, an item "Collate information" specifies information about whether printing is performed page by page or on a document basis if a plurality of copies of a document is to be printed.

In the Finishing information, an item "staple/bind information" specifies information about stapling or binding.

In the Finishing information, an item "punch information" specifies information about punching.

In the Finishing information, an item "folding information" specifies information about folding.

In the Finishing information, an item "trimming information" specifies information about trimming.

In the Finishing information, an item "output tray information" specifies information about an output tray.

In the Finishing information, an item "input tray information" specifies information about an input tray.

In the Finishing information, an item "cover sheet information" specifies information about a cover sheet.

In the "RIP control mode" of the "job attributes within DFE", "Page Mode" or "Sheet Mode" is set. While the "RIP control mode" is set as an item of the "job attributes within DFE" in FIG. 8A, the "RIP control mode" may be set as an attachment to the "job attributes within DFE".

FIG. 8B is an example of a diagram schematically illustrating an example of "job attributes within DFE". In FIG. 8B, "RIP engine identification information" for identifying a plurality of RIP engines 59 is set separately from the "RIP control mode".

If there is only one software manufacturer whose "RIP control mode" is "Sheet Mode", the "Sheet Mode" being set as the "RIP control mode" serves as information to identify an RIP engine (software manufacturer).

(RIP Parameter List)

An "RIP Parameter List" is created from "job attributes within DFE" and a PDL. As mentioned above, the "job attributes within DFE" are information that can be handled by the DFE 32 of company C. In other words, the "job attributes within DFE" are described in terminology and a form such that the job controlling portion 55 can analyze the "job attributes within DFE" and create an "RIP Parameter List". Further, although the "RIP Parameter List" includes the item "RIP control mode", the "RIP control mode" is only one of items in the "job attributes within DFE". The same applies if the "RIP engine identification information" is included.

Accordingly, even if the "RIP control mode" or the "RIP engine identification information" is included, this item may be described from the "job attributes within DFE" to the "RIP Parameter List". In other words, the "RIP Parameter List" is common irrespective of presence or absence of setting of the "RIP control mode" and presence or absence of the "RIP engine identification information". Accordingly, in comparison with the job controlling portion 55 of related art shown in FIG. 3, for example, functions of the job controlling portion 55 in this embodiment are not changed at all or not substantively changed.

FIG. 9 is a diagram showing an example of the "RIP Parameter List".

Input/output data type information specifies types of input or output data (for input or output data, not only a PDL but also a text file or image data such as JPEG are specified).

Reading/writing position specifying method information for input/output data specifies a method for specifying an offset (reading/writing position) of input or output data. For example, it is possible to specify the offset at a designated position, a current position, or an endmost position.

Reading/writing position information for input/output data specifies a current processing position for input and output data.

Reading/writing execution mode information for input/output data specifies an execution mode. For example, READ, WRITE, READ WRITE, or the like is specified.

Unit information (dimensions) specifies a unit to be used within the "RIP Parameter List". For example, "mm", "inch", "pel", "point", or the like is specified.

Compression method information for input/output data specifies a method for compressing input and output data. For example, "UNCOMPRESSED", "PACKBITS", or the like is specified.

"RIP control mode" specifies a control mode in aggregate printing. For example, "Page Mode" or "Sheet Mode" is specified.

An input/output image information portion has "information about an output image", "information about an input image", and "information about handling of an image".

(Information about an Output Image)

Image format type specifies a type of an output image format. For example, raster or the like is specified.

Image format dimensions specify dimensions of an output image format.

Image format resolution specifies resolution of an output image format.

Image position specifies a position of an output image.

Color separation information specifies color separation. For example, "k", "cmyk", "separation", or the like is specified.

Color plane fit policy information specifies a method for expanding color planes.

Plane shift information specifies an amount of shift of a color plane.

Color bit number of an image format specifies a number of color bits of an output image format.

Image direction information specifies a direction of a page of an output image.

Image formation position information specifies positional information about a crop area.

Image formation size information specifies size information about a crop area.

Image formation method information specifies a policy of cropping.

Color ICC information specifies information about a color ICC profile.

Font substitution information specifies information about a substitute for a font.

Image formation origin information specifies an origin of image formation. For example, "center", "upper right", or the like is specified.

Flat K black information specifies information about flat K black.

Rendering information specifies information about rendering (rasterizing).

(Information about an Input Image)

Image format type specifies a type of an input image format. For example, raster or the like is specified.

Image format dimensions specify dimensions of an input image format.

Image format resolution specifies resolution of an input image format.

Image position specifies a position of an input image.

Input data specifies input data.

Page area information specifies a page number.

Color ICC information specifies information about a color ICC profile.

(Information about Handling of an Image)

Scaling offset information specifies an offset of a scaling algorithm. For example, a horizontal offset, a vertical offset, or the like is specified.

Object region information specifies a width and a height of an object region.

Halftone information specifies an offset of halftone. For example, a horizontal offset, a vertical offset, or the like is specified.

Scaling algorithm information specifies a scaling method.

Information about PDL specifies a data area, size information, and a data arrangement method.

Data area specifies information about an area where a PDL is stored. Font information, information about a number of pages, and the like are included in the PDL present in the data area.

Size information specifies a size of the PDL.

Data arrangement method specifies a method for arranging data. For example, little endian, big endian, or the like is specified.

The "RIP control mode" is not limited to a place shown in FIG. 9 and may be set in an other place within the "RIP Parameter List". Further, the wording "RIP control mode" may be removed as long as the "RIP control mode" is included as information.

FIG. 10 is a diagram showing another example of the "RIP Parameter List". In FIG. 10, "RIP engine identification information" (such as a company name in this case) is set following the "RIP control mode". In accordance with this, the RIP controlling portion 58 is capable of selecting the RIP engine 59 by only referring to a specific item ("RIP engine identification information") from the "RIP Parameter List" without detecting "xmlns:A="www.aaa.com/schema/aaa"" or "xmlns:B="www.bbb.com/schema/bbb"" (or "A:Amount" or "B:DeliveryAmount").

(Control Procedure)

Figure 11:
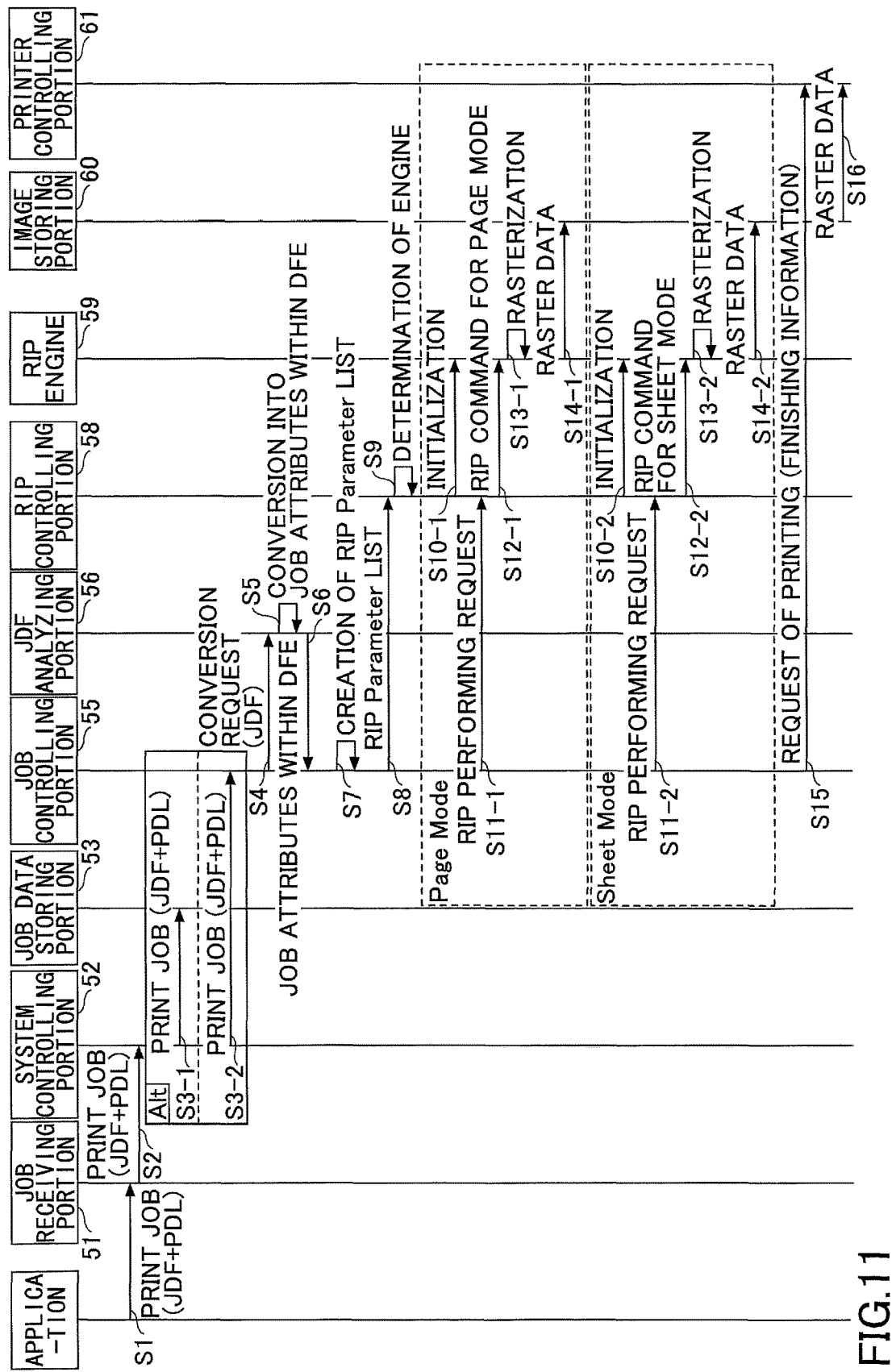
FIG. 11 is an example of a sequence diagram showing an operation procedure of a DFE.

FIG. 11 is an example of a sequence diagram showing an operation procedure of a DFE.

S1: The application 12 transmits a print job (JDF+PDL) to the job receiving portion 51.

S2: The job receiving portion 51 outputs the print job to the system controlling portion 52.

One of a process in Step S3-1 or a process in step S3-2 is performed.

S3-1: If the DFE 32 is set to store the print job in the job data storing portion 53 or the JDF includes setting to store the print job in the job data storing portion 53, the system controlling portion 52 stores the print job in the job data storing portion 53.

S3-2: If there is no such setting to store the print job in the job data storing portion 53, the system controlling portion 52 outputs the print job to the job controlling portion 55.

S4: The job controlling portion 55 outputs the JDF of the print job to the JDF analyzing portion 56 and also outputs a JDF conversion request to the JDF analyzing portion 56.

S5: The JDF analyzing portion 56 converts the JDF in each company's form into "job attributes within DFE" that can be handled by the DFE 32 of company C. Upon conversion, the JDF analyzing portion 56 sets the "RIP control mode ('Page Mode' or 'Sheet Mode')" in the "job attributes within DFE". The "RIP control mode" may be set prior to creation, upon creation, or following the creation of the "job attributes within DFE".

S6: The JDF analyzing portion 56 outputs the "job attributes within DFE" to the job controlling portion 55.

S7: The job controlling portion 55 creates an "RIP Parameter List" from the "job attributes within DFE" and the "PDL".

S8: The job controlling portion 55 outputs the "RIP Parameter List" to the RIP controlling portion 58.

S9: The RIP controlling portion 58 determines a RIP engine 59 to use based on the "RIP Parameter List".

The following processes are different depending on whether the "RIP control mode" is the "Page Mode" or the "Sheet Mode". First, the "Page Mode" is described.

S10-1: The RIP controlling portion 58 initializes the determined RIP engine 59.

S11-1: The job controlling portion 55 requests RIP performing from the RIP controlling portion 58.

S12-1: The RIP controlling portion 58 instead of the job controlling portion 55 outputs an RIP command. If the "RIP control mode" is the "Page Mode", the RIP controlling portion 58 outputs the RIP command in a sequence suitable for the "Page Mode".

S13-1: The RIP engine 59 performs rasterization.

S14-1: The RIP engine 59 stores raster data in the image storing portion 60.

Next, the "Sheet Mode" is described.

S10-2: The RIP controlling portion 58 initializes the determined RIP engine 59.

S11-2: The job controlling portion 55 requests RIP performing from the RIP controlling portion 58.

S12-2: If the "RIP control mode" is the "Sheet Mode", the RIP controlling portion 58 outputs an RIP command in a sequence suitable for the "Sheet Mode".

S13-2: The RIP engine 59 performs rasterization.

S14-2: The RIP engine 59 stores raster data in the image storing portion 60.

Accordingly, when the RIP engine 59 is determined based on the "RIP Parameter List", the RIP controlling portion 58 can control the RIP engine 59 in accordance with the "Page Mode" or the "Sheet Mode". Operations of the job controlling portion 55 are not different between the "Page Mode" and the "Sheet Mode".

S15: The job controlling portion 55 outputs Finishing information along with a request of printing to the printer controlling portion 61. The Finishing information may be output before or after raster data is generated.

S16: The printer controlling portion 61 checks the raster data in the image storing portion 60 upon obtaining the request of printing and performs printing.

The difference between the "Page Mode" and the "Sheet Mode" which is an example of a difference between print jobs results from a difference of software manufacturers of a JDF. If a software manufacturer is determined, the "RIP control mode" is considered to be determined such that companies A and C employ the "Page Mode" and company B employs the "Sheet Mode", for example. Accordingly, instead of having separate sequences for the "Page Mode" and the "Sheet Mode" as shown in FIG. 11, the sequences of the "Page Mode" and the "Sheet Mode" may be switched depending on the RIP engine 59 to use. In other words, it is possible to eliminate a difference of print jobs by selecting the RIP engine 59 and switching the sequences.

(Difference of Sequences Due to Difference of RIP Engines)

Since sequences are different depending on the RIP engine 59, a suitable sequence for each RIP engine is determined in advance in the RIP controlling portion 58. For example, depending on the RIP engine 59, a page processing sequence may be supported or not. The page processing sequence is for controlling rendering of one page on a RIP engine side. In the RIP engine 59 that supports the page processing sequence, when data is transmitted to the RIP engine 59 page by page, the RIP engine 59 autonomously renders each page.

Figure 12:
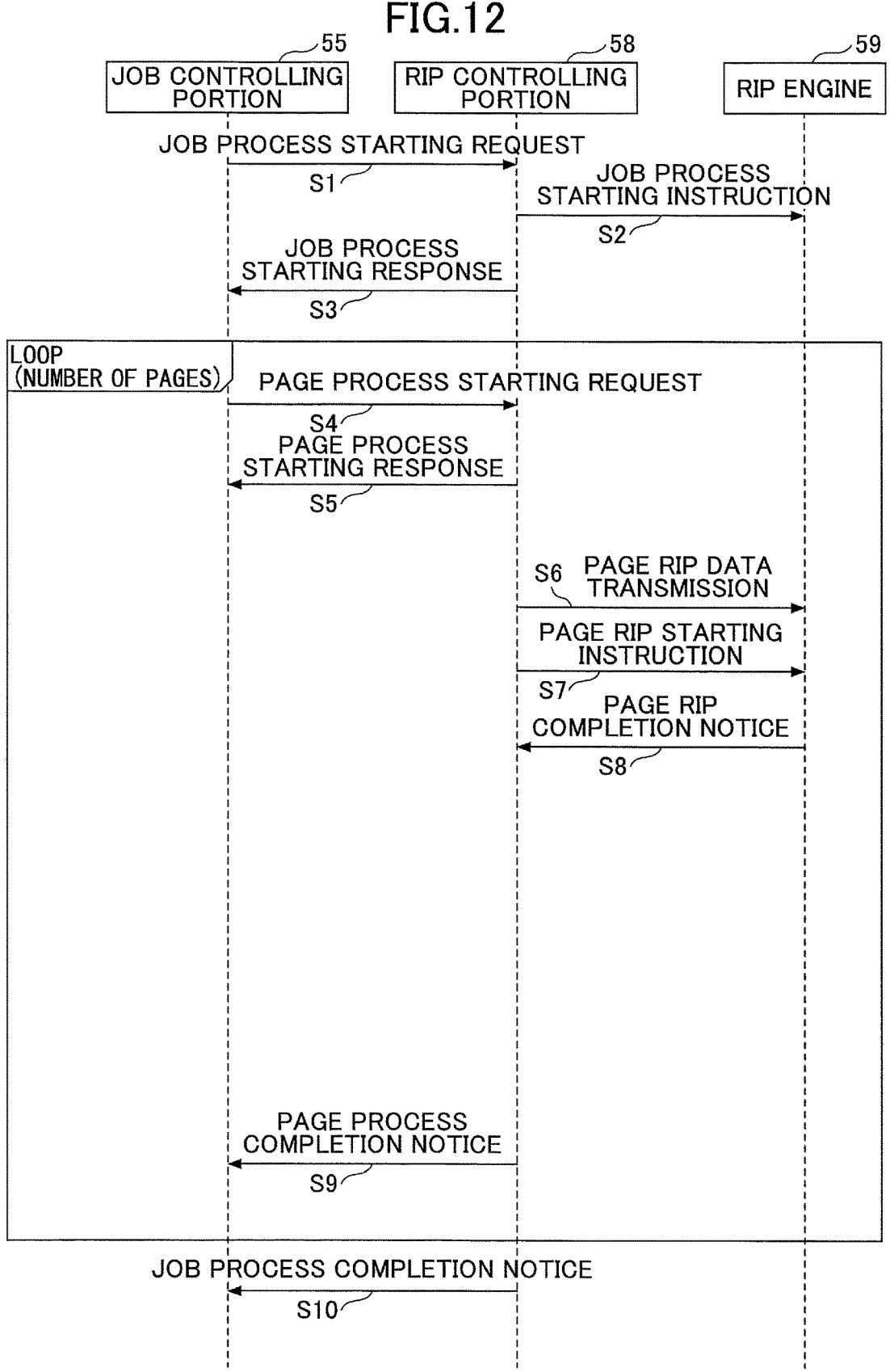
FIG. 12 is an example of a flowchart of a detailed operation procedure mainly showing an RIP controlling portion if an RIP engine supports page processing sequences.

FIG. 12 is an example of a flowchart of a detailed operation procedure mainly showing the RIP controlling portion 58 if the RIP engine 59 supports page processing sequences. This process replaces the process in S11-1 to S13-1 or S11-2 to S13-2 shown in FIG. 11.

S1: The job controlling portion 55 outputs a job process starting request to the RIP controlling portion 58.
S2: The RIP controlling portion 58 outputs a job process starting instruction to the RIP engine 59.
S3: The RIP controlling portion 58 outputs a job process starting response to the job controlling portion 55.

Processes in S4 to S9 are performed on each page and repeated for the number of pages.
S4: The job controlling portion 55 outputs a page process starting request to the RIP controlling portion 58.
S5: The RIP controlling portion 58 outputs a page process starting response to the job controlling portion 55.
S6: The RIP controlling portion 58 outputs page RIP data to the RIP engine 59.
S7: The RIP controlling portion 58 outputs a page RIP starting instruction to the RIP engine 59.
S8: The RIP engine 59 outputs a page RIP completion notice to the RIP controlling portion 58 when rendering one page ends.
S9: The RIP controlling portion 58 outputs a page process completion notice to the job controlling portion 55.
S10: The RIP controlling portion 58 outputs a job process completion notice to the job controlling portion 55.

Figure 13:
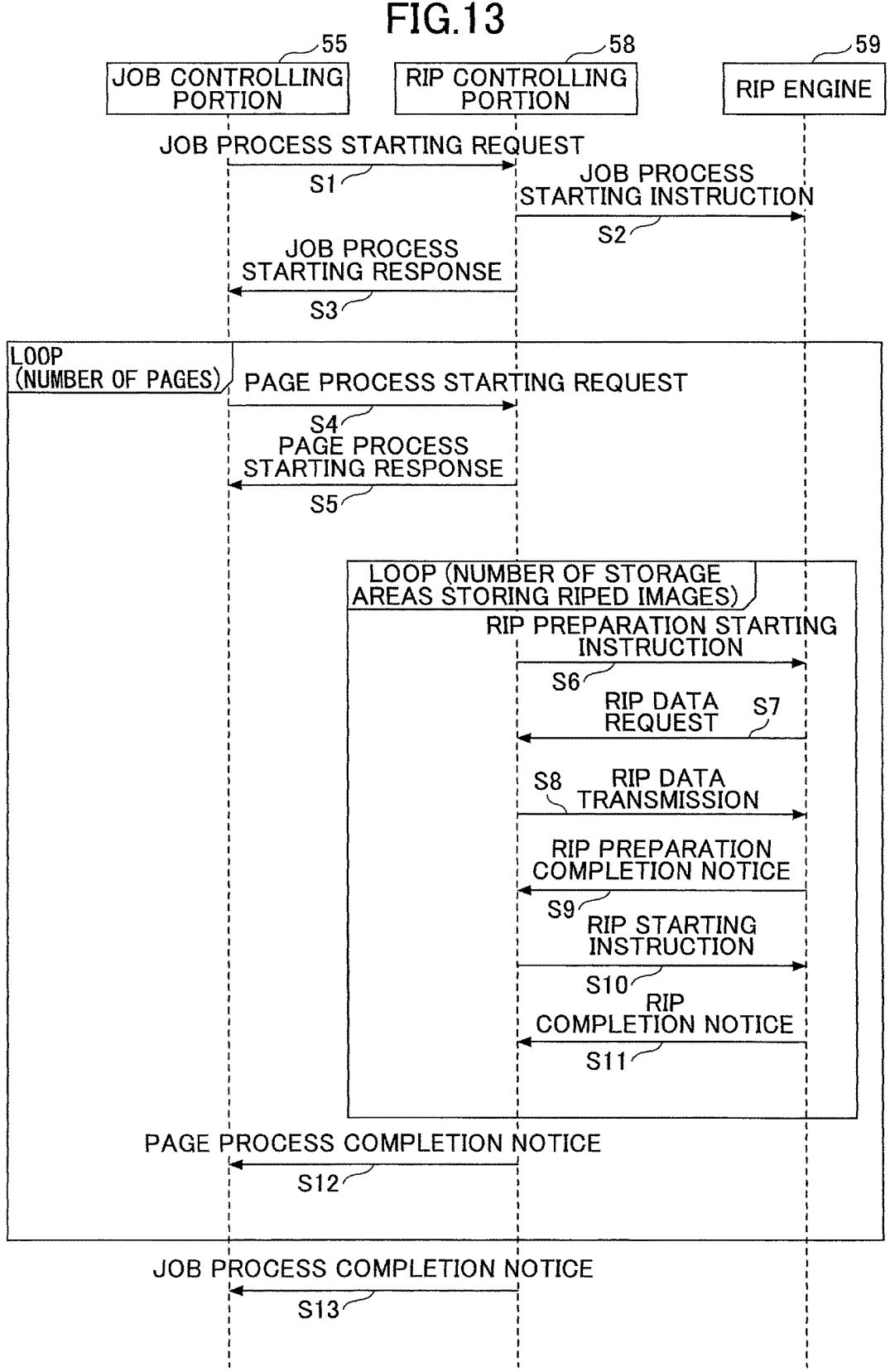
FIG. 13 is an example of a flowchart of a detailed operation procedure mainly showing an RIP controlling portion if an RIP engine does not support page processing sequences.

FIG. 13 is an example of a flowchart of a detailed operation procedure mainly showing the RIP controlling portion 58 if the RIP engine 59 does not support page processing sequences. This process replaces the process in S11-1 to S13-1 or S11-2 to S13-2 shown in FIG. 11.

S1: The job controlling portion 55 outputs a job process starting request to the RIP controlling portion 58.
S2: The RIP controlling portion 58 outputs a job process starting instruction to the RIP engine 59.
S3: The RIP controlling portion 58 outputs a job process starting response to the job controlling portion 55.

A process in S4 to S12 is performed on each page and repeated for the number of pages.
S4: The job controlling portion 55 outputs a page process starting request to the RIP controlling portion 58.
S5: The RIP controlling portion 58 outputs a page process starting response to the job controlling portion 55.

Further, a process in S6 to S11 is repeated for a number of storage areas storing RIPed images. The storage area storing RIPed images refers to an area for storing RIPed images held in the image storing portion 60 (the storage area storing RIPed images is an example of a drawing unit in the Claims). If an area sufficient to store an image of one page is secured, the process is repeated once. If the storage area storing RIPed images has only an M size, for example, and a size of an image of one page is 5×M, the process is repeated five times (=5×M/M).

S6: The RIP controlling portion 58 outputs an RIP preparation starting instruction to the RIP engine 59.
S7: The RIP engine 59 outputs an RIP data request to the RIP controlling portion 58.
S8: The RIP controlling portion 58 transmits RIP data to the RIP engine 59. In other words, since the RIP engine 59 does not support rendering page by page, the RIP controlling portion 58 transmits the RIP data in response to the request from the RIP engine 59.
S9: The RIP engine 59 outputs an RIP preparation completion notice to the RIP controlling portion 58.
S10: The RIP controlling portion 58 outputs an RIP starting instruction to the RIP engine 59.
S11: The RIP engine 59 outputs an RIP completion notice to the RIP controlling portion 58.
S12: When the process in S6 to S11 is repeated for the number of storage areas storing RIPed images (when processing for one page ends), the RIP controlling portion 58 outputs a page process completion notice to the job controlling portion 55.
S13: When rendering of all pages ends, the RIP controlling portion 58 outputs a job process completion notice to the job controlling portion 55.

Since the RIP controlling portion 58 switches sequences depending on the RIP engine 59 as shown in FIG. 12 and FIG. 13, if the RIP engine 59 of each company is installed on the DFE 32, it is possible to appropriately control each RIP engine 59. Accordingly, it is possible to reduce a difference of output results which result from a difference of the RIP engine 59 of each company installed on the DFE 32.

Further, even if a description form of a JDF is different in each company, the JDF converting portion 63 can identify a software manufacturer and convert the JDF into "job attributes within DFE". Further, even if a form of a print job is different in each company, it is possible to eliminate the difference of print jobs when the RIP controlling portion 58 switches control procedures.

While the best mode for carrying out the present invention is described with reference to the embodiment, the present invention is not limited to the specifically disclosed embodiment, but various variations and modifications may be made without departing from the scope of the present invention.

For example, the client PC 11 of the end user environment 1 positioned upstream relative to the DFE 32 of company C executes an application and the JDF converting portion 63 identifies a software manufacturer of the application. However, a printing device positioned upstream relative to the DFE 32 of company C may be present and the printing device may execute the application.

Further, while a JDF is converted in a framework referred to as a printing workflow in the present embodiment, print setting that is not referred to as a JDF may be converted.

Further, while a software manufacturer of the application 12 is identified in the present embodiment, the software manufacturer may indicate a manufacturer of the printing device. Further, the software manufacturer includes a company that has developed the application 12 and a subcontractor for development.

The present invention is not limited to the specifically disclosed embodiments, but various variations and modifications may be made without departing from the scope of the present invention.

DESCRIPTION OF THE REFERENCE NUMERALS 1 end user environment
2 POD printing system environment
11 client PC
12 application
20 process controlling portion
30 digital printing portion
31 printer
32 DFE
40 post-press portion
51 job receiving portion
52 system controlling portion
53 job data storing portion
54 UI controlling portion
55 job controlling portion
56 JDF analyzing portion
57 RIP portion
58 RIP controlling portion
59 RIP engine
60 image storing portion
61 printer controlling portion
62 conversion table
63 JDF converting portion

The invention claimed is:

1. An information processing apparatus for generating drawing data by using printing data and print setting information, the information processing apparatus comprising:
   a processor;
   a plurality of raster image processors configured to generate the drawing data based on the printing data and apparatus setting information; and
   a memory that includes instructions, which when executed, cause the processor to execute the following steps:
   converting the print setting information into the apparatus setting information; and
   analyzing the apparatus setting information to select one of the raster image processors and controlling the selected raster image processor in a control procedure corresponding to the selected raster image processor.

2. The information processing apparatus as claimed in claim 1, wherein the steps executed by the processor further include:
   controlling the selected raster image processor in a control procedure stored in advance for the selected raster image processor.

3. The information processing apparatus as claimed in claim 2,
   wherein the steps executed by the processor further include:
   analyzing the print setting information and including specified information for specifying one of the raster image processors in the apparatus setting information; and
   detecting the specified information included in the apparatus setting information by analyzing the apparatus setting information and selecting the raster image processor specified by the specified information.

4. The information processing apparatus as claimed in claim 2, wherein the steps executed by the processor further include:
   detecting information for selecting one of the raster image processors by analyzing the apparatus setting information and selecting the raster image processor.

5. The information processing apparatus as claimed in claim 4,
   wherein each of the plurality of raster image processors is prepared in advance for an original generator of the printing data and the print setting information; and
   wherein the steps executed by the processor further include:
   analyzing the apparatus setting information to identify the original generator and selecting one of the raster image processors prepared for the original generator.

6. The information processing apparatus as claimed in claim 1, wherein the steps executed by the processor further include:
   using the printing data and the apparatus setting information to generate control data as the apparatus setting information, wherein the step of using generates the control data of the same form irrespective of the selected raster image processor.

7. The information processing apparatus as claimed in claim 6, wherein the steps executed by the processor further include:
   outputting the control data in the same procedure irrespective of the selected raster image processor.

8. The information processing apparatus as claimed in claim 1,
   wherein the steps executed by the processor further include:
   upon detecting that the selected raster image processor has a sequence for controlling a drawing process for one page, instructing the raster image processor to perform drawing page by page; and
   upon detecting that the selected raster image processor does not have the sequence for controlling a drawing process for one page, instructing the raster image processor to perform drawing based on a drawing unit required in the raster image processor.

9. An information processing method executed by an information processing apparatus for generating drawing data by using printing data and print setting information, the information processing method comprising:
   converting, by the information processing apparatus, the print setting information into apparatus setting information;
   analyzing, by the information processing apparatus, the apparatus setting information to select one of a plurality of raster image processors and controlling, by the information processing apparatus, the selected raster image processor in a control procedure corresponding to the selected raster image processor; and
   generating, by the selected raster image processor, the drawing data based on the printing data and the apparatus setting information.

10. A non-transitory computer-readable recording medium storing a computer-readable program that, when executed by a computer, causes an information processing apparatus for generating drawing data by using printing data and print setting information to perform a process comprising:
    converting the print setting information into apparatus setting information;
    analyzing the apparatus setting information to select one of a plurality of raster image processors and controlling the selected raster image processor in a control procedure corresponding to the selected raster image processor; and
    instructing the selected raster image processor to generate the drawing data based on the printing data and the apparatus setting information.

\* \* \* \* \*